Patented Dec. 27, 1938

2,141,230

UNITED STATES PATENT OFFICE 2,141,230

ASPHALT EMULSION

William J. Sweeney and Kenneth C. Laughlin, Baton Rouge, La., assignors to Standard Oil Development Company, a corporation of Delaware No Drawing. Application February 27, 1936, Serial No. 66,056

4 Claims. (Cl. 134—1)

This invention relates to the production of bituminous materials which are adapted for use in the prepartion of bituminous emulsions, particularly bituminous emulsions which are required to be stable for long periods of time in order to provide time for their transportation and also for a possible long delay before their use.

In the preparation of bituminous paving mixtures, bituminous emulsions have been used to coat the individual pieces of mineral aggregates. Evaporation, as well as contact with the mineral aggregates, caused the bituminous emulsions to break and precipitate the bituminous materials on the surfaces of the individual pieces of the mineral aggregates. These bituminous emulsions were generally prepared by incorporating into asphalts, fatty oils or fatty acid oils. Aqueous solutions of alkalies were also prepared. The aqueous solutions were heated and to them with vigorous stirring the asphalts which had first been melted by heating were added and bituminous emulsions were formed. The bituminous emulsions thereby prepared contained greater quantities of water than that of asphalt with the result that only very thin layers or coats of asphalts were precipitated on the surfaces of the individual pieces of the mineral aggregates and therefore did not strongly bind the individual pieces of mineral aggregate together.

An object of this invention is to produce an asphalt which is suitable for use in the preparation of a bituminous emulsion which will contain up to about 60% of asphalt.

Another object of this invention is to produce a bituminous emulsion which will remain stable over a long period of time but will readily break when used to coat a mineral aggregate.

These and other objects of this invention will be readily understood on reading the following description of one method of preparing the asphalt and its use in the preparation of a bituminous emulsion.

The method of preparing the asphalt will be described with reference to one particular asphaltic petroleum crude oil for illustration only as other asphaltic petroleum crude oils may be used and the percentages of distillates, extracted oils and asphalt separated will vary according to the compositions of the petroleum crude oils used.

According to this invention a Venezuelan crude (Lago) is distilled at temperatures below 400° F. and a fraction is separated as a distillate. To the residual oil for each volume of residual oil there is added with vigorous stirring about five volumes of a light hydrocarbon solvent that is gaseous at normal temperature and pressure such as propane, butane, ethane, etc., either by themselves or in combination with each other and with or without the additions of a selective solvent, such as phenol, cresol, aniline, furfural, etc. The light hydrocarbon solvent preferred is that containing $C_2$ to $C_4$ atoms per molecule. The mixture of light hydrocarbon solvent and residual oil is maintained at a temperature of about 250° F. and under sufficient pressure to keep the solvent liquid and allowed to settle into two layers. The layers are separated and debutanized at temperature of about 250° F. The layers on debutanization yield a lubricating oil containing about 5% of the light hydrocarbon solvent and an asphalt containing about 5% of the light hydrocarbon solvent. The lubricating oil and asphalt are then stripped with natural gas or steam at a temperature of about 400° F. Other gases can be used for example refinery gas for removing the last fractions of light hydrocarbon solvent. By treating the residual oil by this method it is possible to vary the softening point of the bituminous material from somewhat below 100° F. to 200° F. and above. These variations are brought about by varying the compositions of the solvent, the amount of the solvent used and the temperature at which separation takes place. Pressure also is changed with the composition of the solvent and/or temperature of separation.

The bituminous materials are generally called asphalts and emulsifying asphalts with low penetrations and high softening points are produced by propane precipitation of reduced crudes. The crudes themselves may be treated with propane and asphalts separated without first reducing the crude if desired though it is preferred to reduce the crudes before treating. By this treatment of reduced crudes with low boiling hydrocarbon solvents asphalts with emulsifying characteristics equal to those of the 180/200 penetration at 77° F. asphalts currently used for emulsion but with penetrations as low as 20/77°/100 gms./5 seconds are produced.

The asphalts with a high content of emulsifying agents are produced by low boiling hydrocarbon solvent treatment of crude petroleum oils and may be blended with non-emulsifying asphalts for the production of emulsions. Low boiling hydrocarbon solvent precipitated asphalts retain in the asphalt a high percentage of the emulsifying agents originally in the crude. These asphalts may be used to reduce the amount of added emulsifying agent necessary for slow setting emulsions, or may be added to other asphalts to produce an asphalt mixture suitable for the preparation of quick-setting penetration emulsions.

The asphalts preferred for making emulsions or for blending with other asphalts to produce emulsions are those obtained in the simultaneous extraction of residual oils with two solvents for example propane and cresylic acid. These may be used directly as an emulsifying asphalt, or may be blended with non-emulsifying asphalts in order to obtain a mixture of asphalts which may be emulsified. The two-solvent process favors the production of the wax free asphalt with a high content of emulsifying agents.

For example 20% of an asphalt precipitated from a Venezuelan crude (Lago) is blended with 80% of pipe still bottoms reduced at a temperature range of 620° to 650° F. Both asphalts had a penetration of 180/200. 55% of this asphalt blend is mixed with 0.13% of caustic soda used as an emulsifying aid, 0.7% bentonite used as a stabilizing agent and 44.8% of water. The water, caustic soda and bentonite was first mixed and heated after which the hot molten asphalt blend was added. The resulting emulsion was very stable in that a fraction after standing 10 days in a 4 ounce bottle did not show that any sediment settled out or any separation whatsoever. The difference in the asphalt content of top and bottoms portions after standing 10 days was 1.44%. The demulsibility was 98.0%. The color was good and there was no evidence of unemulsified particles. The asphalt obtained by reducing pipe still bottoms at 620° to 650° F. does not emulsify satisfactorily but on the addition of a small fraction of low boiling hydrocarbon precipitated solvent it emulsifies readily and breaks.

Slower breaking emulsions can be prepared by blending 60% propane precipitation asphalt from a Lake Venezuela crude oil with 40% of pipe still bottoms prepared by reducing the same crude at 620° to 650° F. The emulsion is prepared by mixing 52% of the asphalt blend with 0.15% of caustic soda dissolved in 47.85% of water. The stability of this emulsion on 10 days standing is 94.2% and the demulsibility is 57.0%. Addition of soaps in amounts less than 1% give satisfactory stability.

The emulsifying asphalts are preferably prepared by propane precipitating a Venezuela crude that had been reduced to 80% bottoms using a 400° F. maximum temperature. The proportion of propane to oil is 4 to 1 and the separation temperature is about 185° F. The temperature may be varied ±10° to control the penetration of the product. The bottom layer formed is separated, stripped of propane with gas or steam at 400° F. maximum temperature.

The emulsions prepared according to this process are especially useful in road surfacing where an asphalt of good penetration and/or quick breaking type is required. The asphalt thrown out of solution penetrates deeply into a gravel bed. The natural emulsibility or emulsifying tendencies of asphalt can be varied or controlled by using a blend containing a variable amount of solvent precipitated asphalt added to an asphalt prepared by reduction at high temperature (above 500°–600° F.).

The foregoing description is merely illustrative and various changes and alternative arrangements may be made within the scope of the appended claims in which it is our intention to claim all inherent novelty in the invention as broadly as the prior art permits.

We claim:

1. An emulsion containing over 50% of a blend of about 20% propane precipitated asphalt obtained from a reduced asphalt-containing petroleum crude oil that had not been subjected to a temperature higher than 400° F., and about 80% a straight high temperature reduced asphalt, about 0.13% caustic soda, 0.7% bentonite and water to make 100%.

2. An emulsion containing over 50% of a blend of about 60% propane precipitated asphalt obtained from a reduced asphalt-containing petroleum crude oil that had not been subjected to a temperature higher than 400° F., about 40% of a high temperature straight reduced asphalt, 0.15% caustic soda and water to make 100%.

3. An aqueous asphalt emulsion containing over 50% of asphalt and sufficient caustic soda to react with the saponifiable constituents naturally present in the asphalt, said asphalt present in the emulsion being composed of a blend of at least 20% propane precipitated asphalt obtained from a reduced asphalt-containing petroleum crude oil that had not been subjected to a temperature higher than 400° F. and a straight high temperature asphalt.

4. An aqueous asphalt emulsion containing over 50% of asphalt and about 0.15% of caustic soda, said asphalt present in the emulsion being composed of a blend of at least 20% propane precipitated asphalt obtained from a reduced asphalt-containing petroleum crude oil that had not been subjected to a temperature higher than 400° F. and a straight high temperature asphalt.

WILLIAM J. SWEENEY.
KENNETH C. LAUGHLIN.